United States Patent

Flater

[11] Patent Number: 5,988,666
[45] Date of Patent: Nov. 23, 1999

[54] FIFTH WHEEL HITCH RELEASE

[75] Inventor: James H. Flater, Holland, Mich.

[73] Assignee: Holland Hitch Company, Holland, Mich.

[21] Appl. No.: 08/896,390

[22] Filed: Jul. 18, 1997

[51] Int. Cl.$^6$ ................................................ B62D 53/12
[52] U.S. Cl. ............................................ 280/434; 280/508
[58] Field of Search ................................ 280/433, 434, 280/435, 508

[56] References Cited

U.S. PATENT DOCUMENTS

| | | | |
|---|---|---|---|
| 2,581,254 | 1/1952 | Greenawalt | 280/33.05 |
| 2,772,895 | 12/1956 | Steeves | 280/432 |
| 2,977,137 | 3/1961 | Durham | 280/434 |
| 3,079,175 | 2/1963 | Walther | 280/434 |
| 3,239,239 | 3/1966 | Worden | 280/434 |
| 3,352,571 | 11/1967 | Nelson | 280/435 |
| 3,434,736 | 3/1969 | Linder | 280/434 |
| 3,539,202 | 11/1970 | Nelson | 280/434 |
| 3,640,549 | 2/1972 | Neff et al. | 280/435 |
| 3,888,514 | 6/1975 | Klein | 280/434 |
| 3,892,426 | 7/1975 | Ferris | 280/432 |
| 4,008,904 | 2/1977 | Davies | 280/434 |
| 4,106,793 | 8/1978 | Neff | 280/434 |
| 4,447,070 | 5/1984 | Inoue | 280/434 |
| 4,592,566 | 6/1986 | Inoue | 280/433 |
| 4,871,182 | 10/1989 | Altherr | 280/434 |
| 4,946,183 | 8/1990 | Benson | 280/434 |
| 5,028,067 | 7/1991 | Madura | 280/434 |
| 5,120,080 | 6/1992 | Ritter | 280/433 |
| 5,137,298 | 8/1992 | Madura | 280/434 |
| 5,257,796 | 11/1993 | Thorwall et al. | 280/434 |
| 5,456,484 | 10/1995 | Fontaine | 280/434 |
| 5,516,137 | 5/1996 | Kass et al. | 280/434 |
| 5,516,138 | 5/1996 | Fontaine | 280/434 |
| 5,641,174 | 6/1997 | Terry et al. | 280/434 |

*Primary Examiner*—Lanna Mai
*Assistant Examiner*—Andrew J. Fischer
*Attorney, Agent, or Firm*—Price, Heneveld, Cooper, DeWitt and Litton

[57] ABSTRACT

A fifth wheel hitch operable between a fully locked condition and a fully released condition, having a top hitch plate and a lock jaw, a locking plunger shiftable between a biased, extended locking position engaging the jaw and a retracted position for releasing the jaw, a release lever pivotally mounted to the hitch plate and engaging the plunger to move the plunger therewith when actuated, for releasing the primary lock, a hitch release rod subassembly having an outer pull handle and an inner pivotal connection to the release lever for actuating the release lever, the release rod subassembly having a secondary stop aligned with an abutment surface in the fully locked condition to serve as a secondary lock, and shiftable out of alignment with the abutment surface to release the secondary lock, and having a limited play connection between its ends, enabling the subassembly to be lengthened a limited amount from its normal length to a lengthened condition, and biased toward the normal length condition, and having an indictor which provides a change in appearance between the normal length condition and the lengthened condition.

3 Claims, 8 Drawing Sheets

FIFTH WHEEL HITCH RELEASE

BACKGROUND OF THE INVENTION

This invention relates to fifth wheel hitches, and particularly to a primary lock-secondary lock fifth wheel hitch.

For safety reasons, fifth wheel hitches are now required to have a secondary lock as well as a primary lock. This often involves movement of the hitch release pull rod and handle in varying positions during release and during recoupling. Because of this, an inexperienced operator might become confused as to whether the hitch is fully released during uncoupling or fully secured during coupling.

SUMMARY OF THE INVENTION

A fifth wheel hitch lock mechanism with a primary lock and a secondary lock, both releasable by use of the release handle and rod, and visually indicating fully coupled condition and fully uncoupled condition. The release rod subassembly has a limited play connection between its ends, enabling it to be lengthened a limited amount from its normal length condition to a lengthened condition under tension, but biased toward the normal length condition. An indicator provides a change in appearance between the normal length condition and the lengthened condition.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
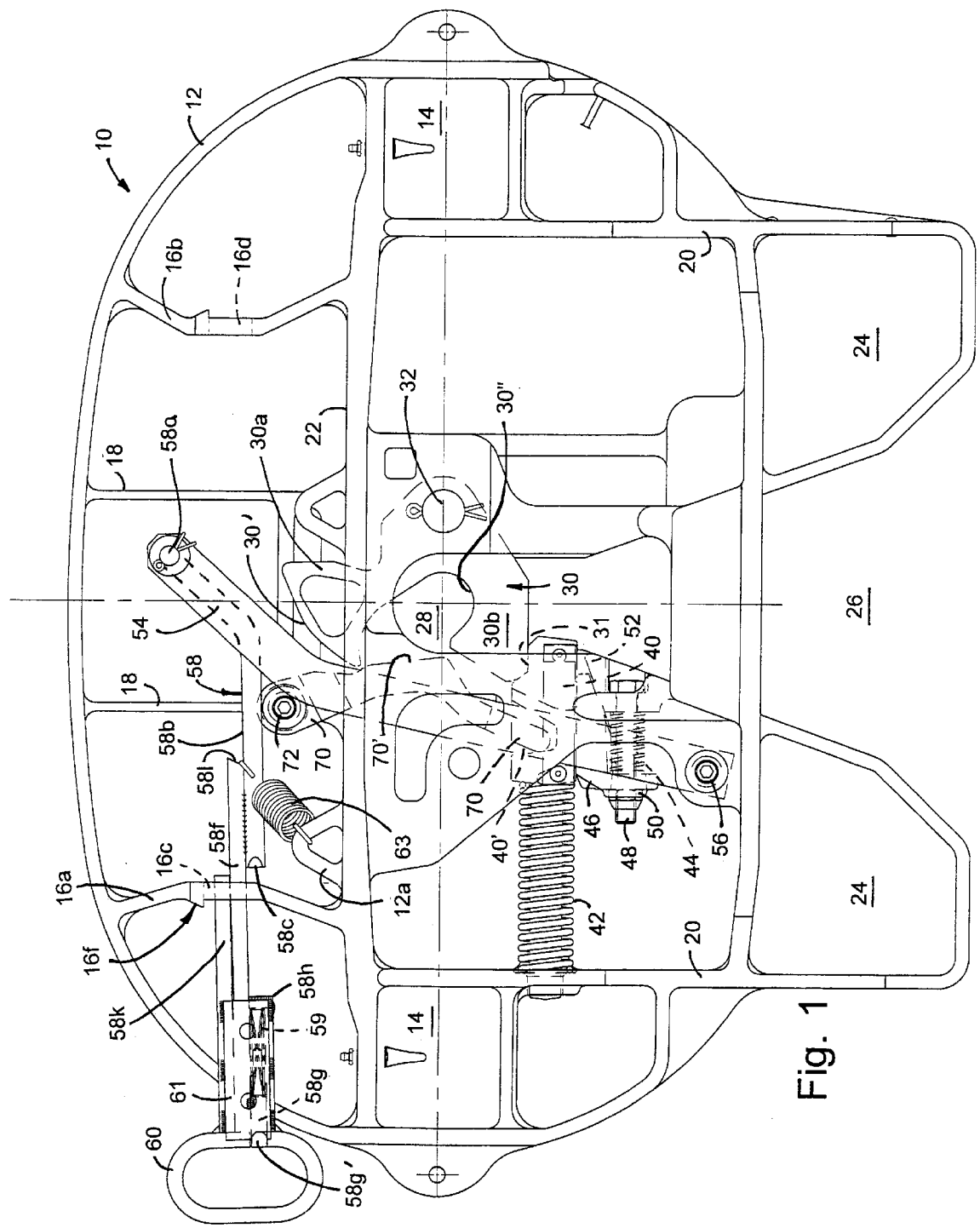
FIG. 1 is a bottom view of the novel hitch showing it in the fully locked condition.

Referring now specifically to the drawings, the fifth wheel hitch 10 there depicted includes a top plate 12 of generally conventional type, having a convex forward end and a bifurcated rear, as well as a pair of laterally spaced trunnions 14 for pivotally mounting the plate and thereby enabling it to tilt from the true horizontal but remain in a generally horizontal orientation. The top surface of plate 12 may be a conventional slide surface of varying types. In the figures, the bottom of the top plate is illustrated for clarity. It includes a plurality of downwardly protruding, transverse and fore-to-aft flanges 16a, 16b, 18, 20 and 22, and others, which rigidify the hitch and also support and cooperate with other components in a manner to be described hereinafter. The rear end of the hitch has bifurcated portions 24 which define a forwardly extending mouth 26 therebetween, terminating in a dead end throat 28 to receive the kingpin.

The primary fifth wheel features and kingpin lock correspond to those taught in prior U.S. Pat. No. 5,257,796, issued Nov. 2, 1993, assigned to the assignee herein, and incorporated herein by reference.

Figure 8:
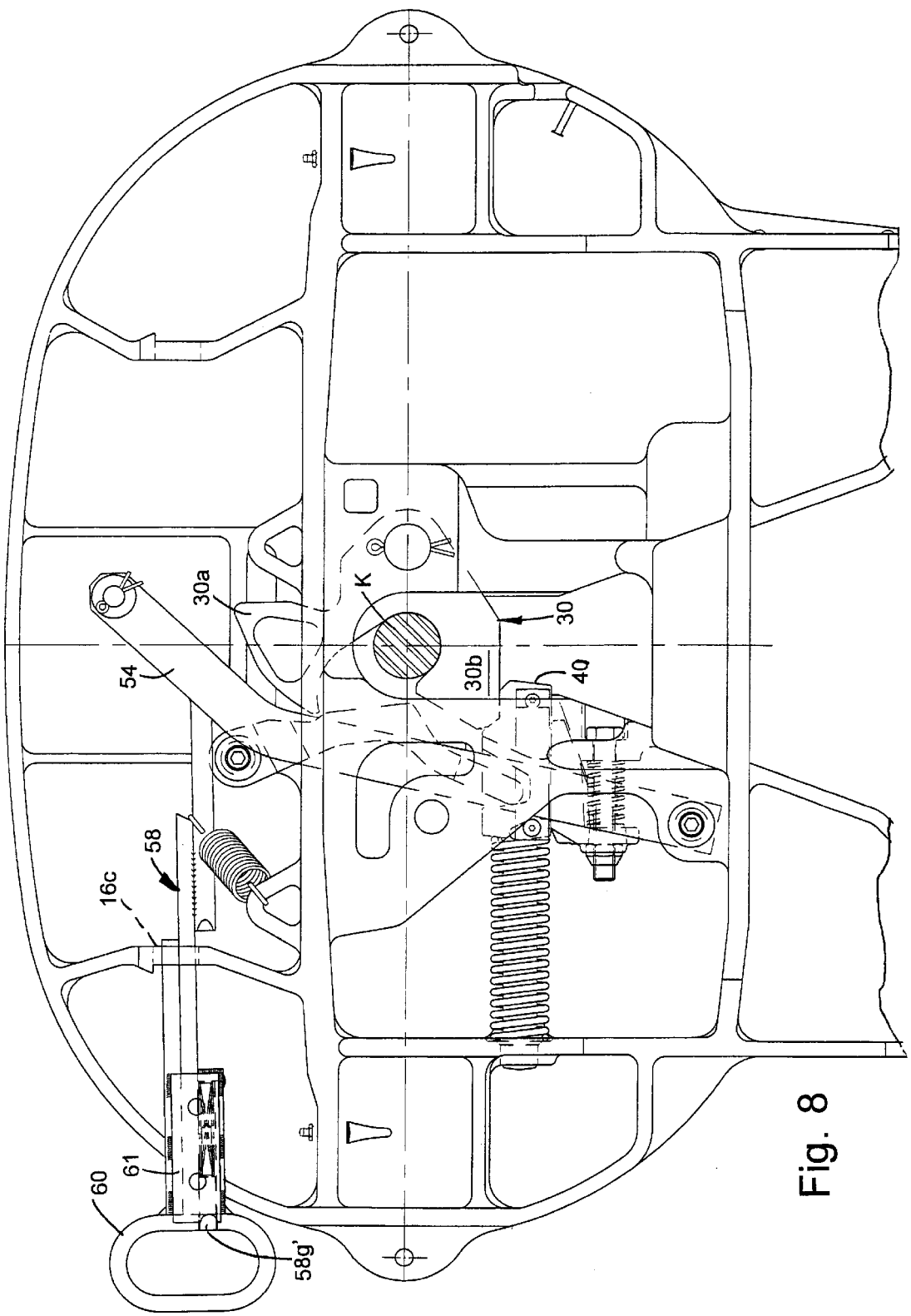
FIG. 8 is a bottom view of the hitch fully recoupled with the kingpin.

Adjacent throat 28 is a pivotal, generally V-shaped lock element or jaw 30 bifurcated into two integral branches 30a and 30b and pivotally mounted at the apex between these two branches to a vertical pivot pin 32 fixed to plate 12. Branch 30b is a locking branch, while lock 30a will, for convenience, be called a camming branch. Pivot pin 32 is laterally offset from the dead end portion of throat 28. Jaw 30 pivots on pin 32 between the fully closed lock position across the throat as shown in FIGS. 1 and 8, and the fully open position shown in FIG. 6. Lock jaw 30 has a concave recess between branches 30a and 30b to cooperate with the concave forward end of throat 28 and thereby cylindrically surround the neck of a kingpin. Branch 30b is generally rearward of the axis of pivot pin 32 while branch 30a is generally forward of this axis, except in the fully open position of the lock jaw.

The forward branch 30a comprises a protruding finger which has a camming surface 30' near the end thereof. The rearward branch 30b includes the concave kingpin lock surface 30" on its inner face and a lock plunger engagement surface 31 on its outer face. A locking plunger 40 is laterally reciprocable between an extended locking condition and a retracted condition which is against the bias of coil spring 42. Spring 42 is around the shaft of the plunger, between the plunger head and one of the flanges 20. Spring 42 biases the plunger to the extended locking condition. In the fully extended position of the plunger, it engages surface 31 of jaw 30 to lock this jaw in a closed position around a kingpin. Any wear between the plunger and the lock jaw is compensated for by a wedge 46 biased by spring 44 toward a wedging action on the plunger, in conventional fashion. Wedging element 46 has an L-shaped configuration with one flange thereof being positioned on stud 48 and with nut 50 limiting movement of the wedging element with a retracting plunger. The wedging element rides against a sloping surface of a fixed wedge 52 in conventional fashion.

The hitch release mechanism depicted is a so-called "right-handed" release. Therefore, it is shown, and is described below, with a release lever 54 pivotally mounted to the plate at one end of the lever, engaged through a slot in plunger 40 intermediate the ends of the lever, and pivotally connected to the pull rod at the other forward end of the lever. The invention will be largely described relative to this right-handed model. If a left-handed model is desired, release lever 5 will be pivotally mounted to plate 12 intermediate its ends at a point between plunger 40 and the lever forward end, and release rod 58 will extend out the opposite side of the hitch plate as in U.S. Pat. No. 5,257,796 referenced above, so that in either arrangement, pulling of the handle will cause lever 54 to move in the same direction as in the other arrangement. In a left-handed hitch, the pull rod extends through window 16d in rib 16b so that the handle is accessible at the opposite side of the plate from that illustrated in the figures. These are equivalent arrangements.

With hitch release lever 54 pivotally mounted to plate 12 at the lever rearward end on vertical pin 56, and extending through a slot in plunger 40, pivoting of release lever or arm 54 in one direction away from throat 28 causes retraction of plunger 40, while pivoting in the opposite direction occurs with plunger extension rearwardly of arm 30b of jaw 30.

Pivotally connected to the forward end of lever 54 is the ninety degree bent inner end 58a of pull rod subassembly 58, specifically the end 58a of elongated bar segment 58b. The opposite end 58c of bar segment 58b is a stop, as will be explained, for abutment against rib 16a of plate 12, to serve as the secondary lock. Connected to bar 58b in offset, overlapping fashion is elongated bar segment 58f. Segment 58f can be welded to segment 58b to be integral therewith. The outer end of segment 58f has an offset abutment 58g for engaging the outer end of a compression spring 59. In sliding engagement with segment 58f is an elongated bar segment 58k having a pull handle 60 at its outer end. A pair of side plates 61 are attached as by weldment to the top and bottom of segment 58k, astraddle the outer end portion of segment 58f and spring 59. Affixed to plates 61, between them, is an inner stop 58h at the second end of spring 61, such that compression spring 61 is trapped between stops 58g and 58h. An end indicator portion 58g' of stop 58g at handle 60 is visible through a notch in plate 61 in the fully locked condition and in the fully released condition of the hitch, as will be explained further. A tension coil spring 63 is attached at one of its ends to a loop 12a in plate 12 and at its other end to pull rod subassembly 58 as at the juncture of segments 58b and 58f. Spring 63 biases the pull rod subassembly rearwardly, and more significantly biases it in a manner to cause the outer end stop 58c to align with flange 16a rather than the window 16c in flange 16a. In the fully locked condition of the hitch, segments 58f and 58k extend through window 16c. In the interim position segment 58b extends through the window. In the fully unlocked condition of the hitch, segments 58f and 58b extend through window 16c. The width of window 16c is only large enough to at most accommodate two of these three segments at one time.

Also pivotally mounted to top plate 12 is a special elongated dog leg-shaped cam arm 70. It is positioned between lock element 30 and release arm 54. This cam arm is pivotally mounted at its forward end on a pivot pin 72. Its generally dog leg-shaped configuration includes a cam follower surface 70' at the apex intermediate its ends. It also has its rearward end projecting into a slot 40' in plunger 40, to move with the plunger and release arm 54. Thus, cam arm 70 will be moved with the plunger when the release arm and release handle are manually actuated to unlock the locking jaw 30. Likewise, when plunger 40 is biased by spring 42 to an extended position, release arm 54 and cam 70 will move therewith. Further, the cam also has a relationship to the locking jaw 30 as well as to the release arm and handle as just noted. More specifically, cam surface 30' on finger 30a of lock jaw 30 will, when lock jaw 30 is rotated, engage cam surface 70' of cam element 70 to thereby shift the cam element away from the throat of the hitch, tending to retract plunger 40 slightly and also to shift release arm 54 and release handle 58.

Figure 5:
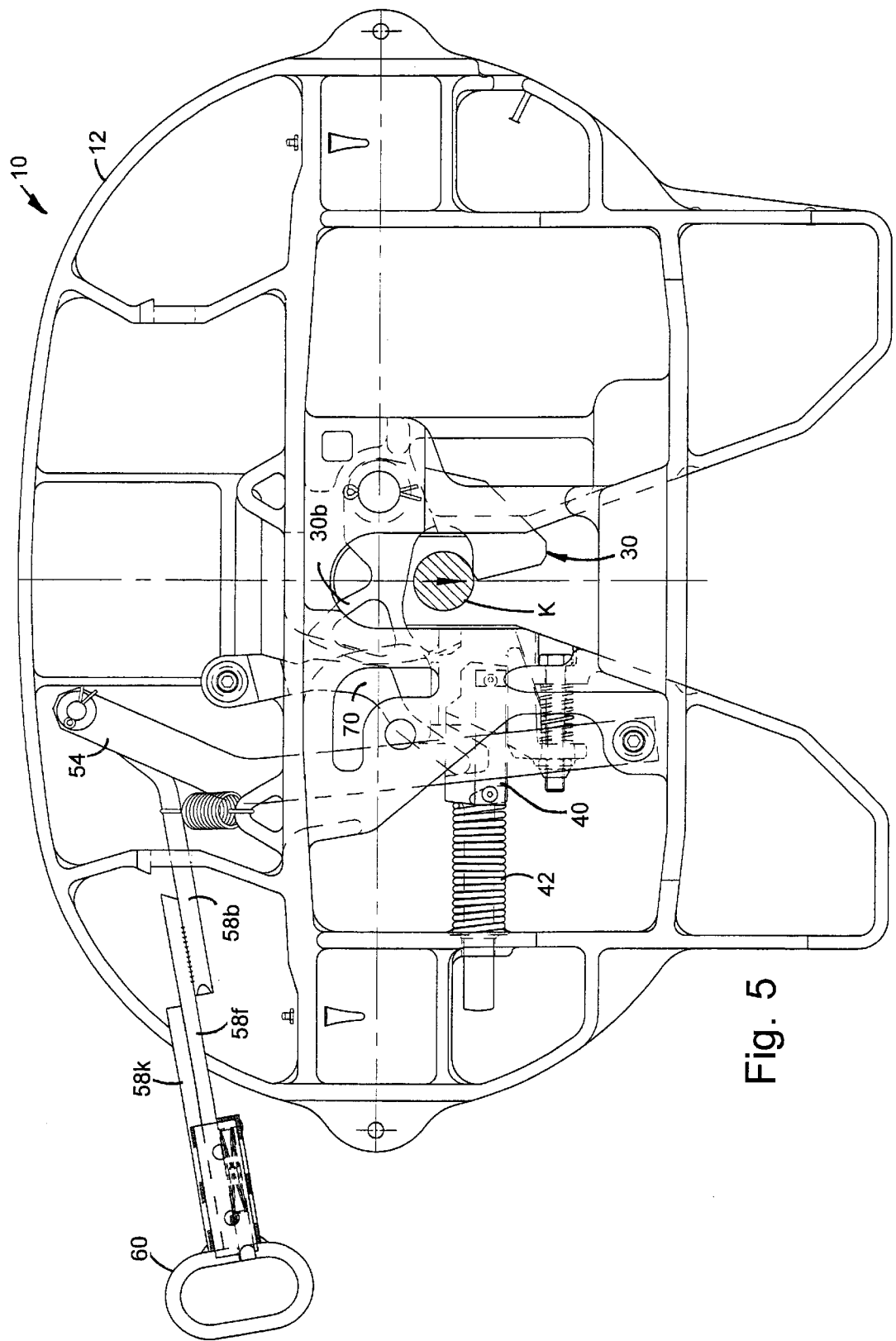
FIG. 5 is a bottom view of the hitch showing the kingpin starting to move the pivotal lock jaw and leave the hitch.
Figure 6:
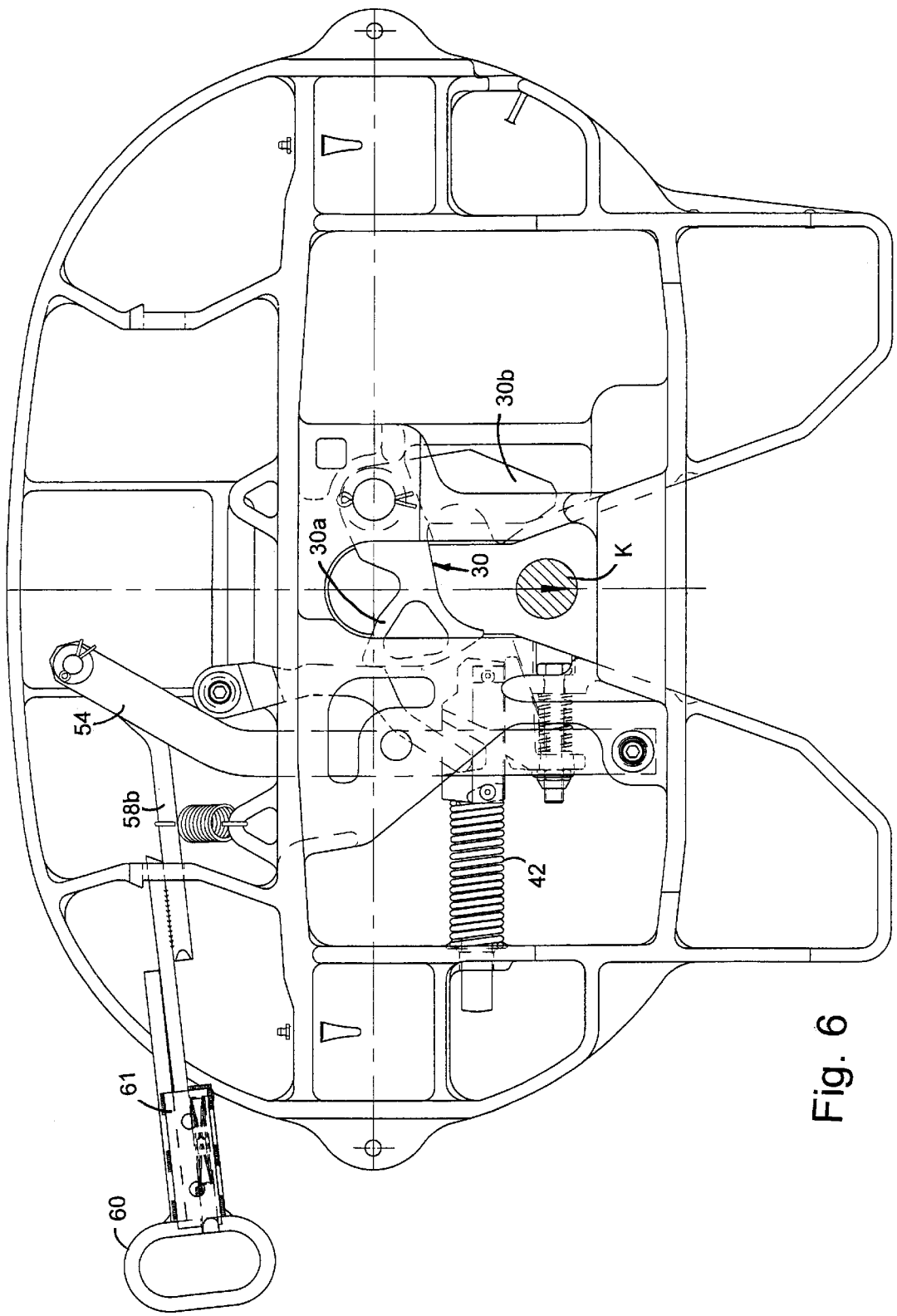
FIG. 6 is a bottom view of the hitch showing the kingpin having swung the lock jaw fully open and leaving the hitch to be ready to recouple.

The eight figures of the drawings depict a series of hitch component movements ranging from the fully locked position in FIG. 1 through conditions of release until the hitch is in the full release condition of FIG. 6, and then back to a fully locked position on a kingpin. For purposes of clarity, the kingpin is not shown in FIGS. 1–6.

Figure 2:
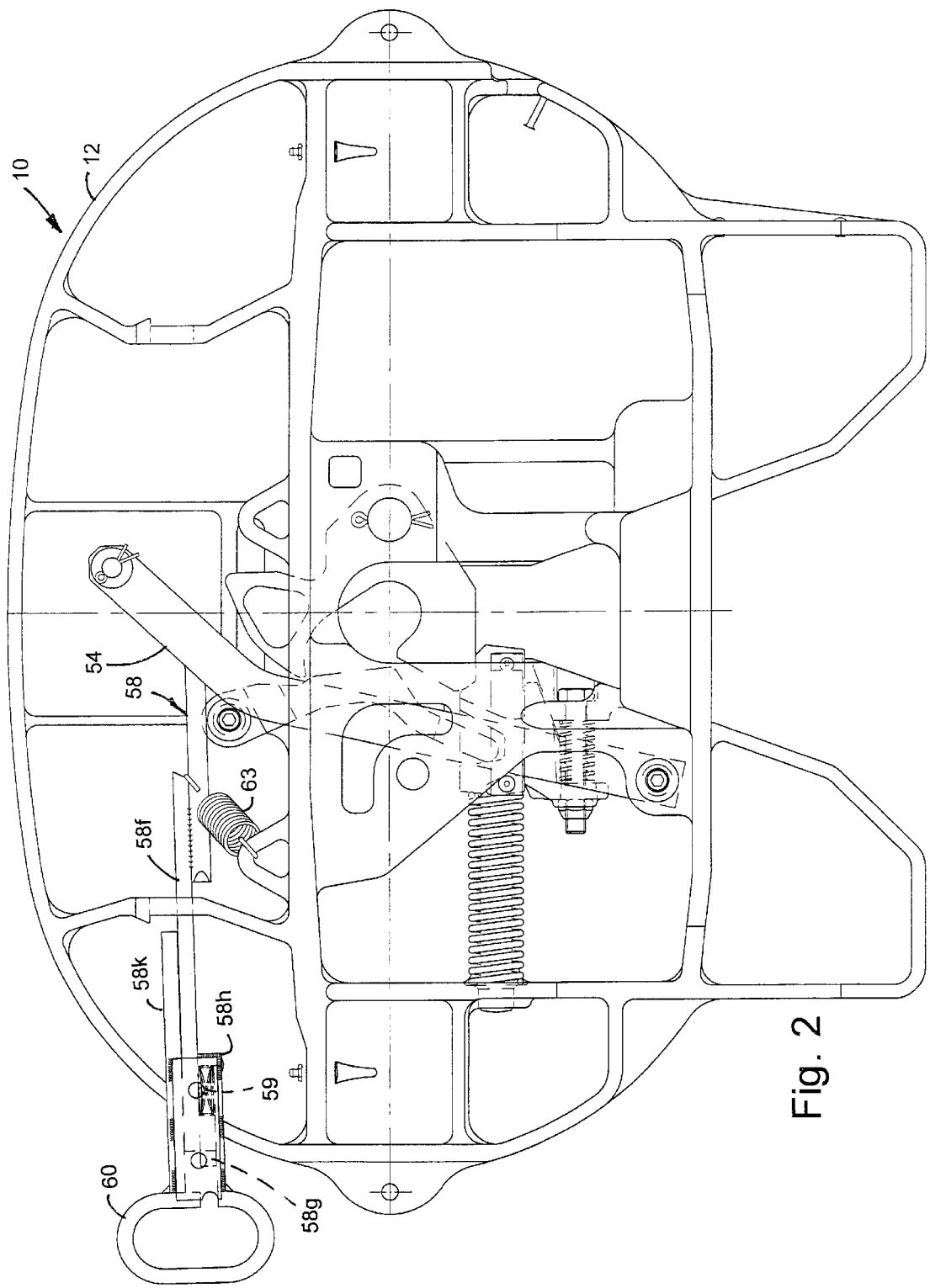
FIG. 2 is a bottom view of the hitch showing the release handle and rod having been pulled slightly for exposing a window for disengagement of the secondary lock.

Referring first to FIG. 1, jaw 30 is shown fully closed, and having a primary lock due to plunger 40 engaging the jaw rearward face 31, and pull rod subassembly 58 being in a retracted position with handle 60 closely adjacent the outer edge of slide plate 12. In this fully locked condition, the pull rod subassembly is of its normal length such that indicator portion 58g' (FIG. 1) of abutment 58g is visible beyond plate 61. This plate preferably has a notched opening for viewing of portion 58g'. In this fully closed locked position, abutment 58c is in alignment with flange 16a due to the tensile bias of spring 63, to serve as a secondary stop. In other words, if for some reason the release lever 54 is moved in a direction away from throat 28, this movement will be limited by engagement of stop 58c against flange 16a. To open the hitch mechanism so as to receive or release a kingpin as when a truck tractor with the fifth wheel hitch thereon is backing up to a trailer having a depending kingpin at its front end, handle 60 is first pulled an initial amount as shown in FIG. 2. This pulling action extends the length of pull rod subassembly 58 as handle 60 is moved away from slide plate 12. That is, this movement causes compression of spring 59 between abutments 58h and 58g as segment 58k moves out of window 16c. Also, indicator portion 58g' of abutment 58g moves out of sight between plates 61 as in FIG. 2. This first movement of the release rod subassembly does not cause movement of release lever 54 because compression spring 42 is much stronger than the small compression spring 59. At this point, stop surface 58c is still in alignment with flange 16a rather than window 16c to continue to serve as a secondary stop.

Figure 3:
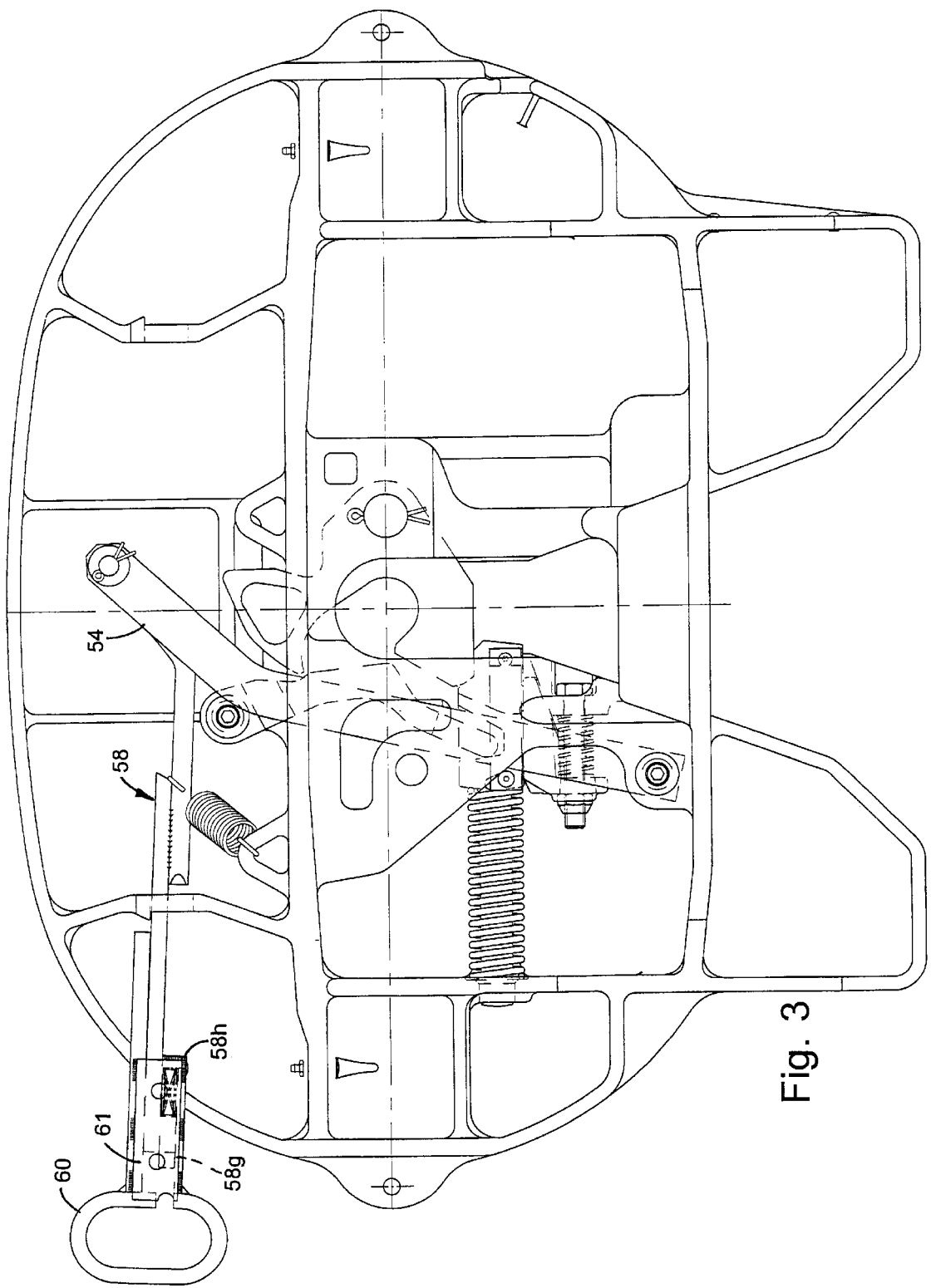
FIG. 3 is a bottom view of the novel hitch with the release handle and rod shifted laterally, forwardly of the hitch, to deactuate the secondary lock.
Figure 4:
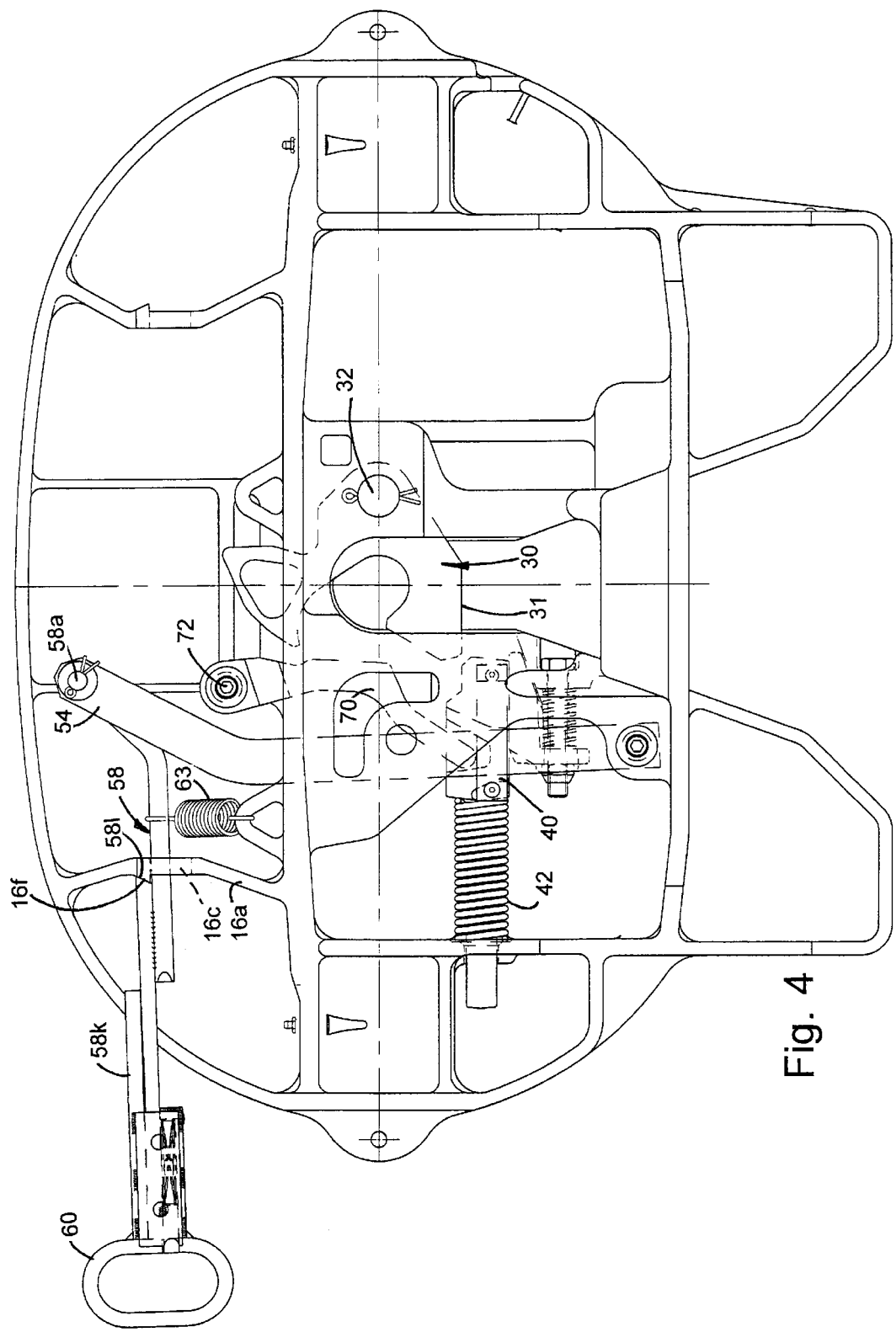
FIG. 4 is a bottom view of the hitch showing the release handle and rod pulled further for release of the primary lock and ready for uncoupling.

As the next step to release the hitch, handle 60 and pull rod subassembly 58 are moved laterally relative to the rod, i.e., forwardly relative to hitch plate 12 as depicted in FIG. 3, to align segment 58b and its stop surface 58c with window 16c. This movement is against the bias of tension coil spring 63. As the next movement to unlatch the hitch, handle 60 is pulled lengthwise of the rod and laterally to the hitch plate until intermediate release rod segment 58f is completely through window 16c and can be hooked at its slanted inner end surface 58l against a similarly slanted, fixed outer surface 16f on flange 16a. This movement of release rod subassembly 58 causes pivoting of release lever 54 about its pivot pin 56. This pivotal movement causes plunger 40 to be retracted against the bias of its spring 42 in order to cause plunger 40 to clear the end of branch 30b of jaw 30 and thereby allow the jaw to pivot on its pin 32. At this point, the truck tractor with the fifth wheel hitch can be moved away from the trailer having the kingpin so that the kingpin causes jaw 30 to rotate to its open position. As it rotates, camming branch 30a engages the cam follower surface 70' of cam arm 70 to move the cam arm slightly and thereby also shift plunger 40 a slight amount further against its coil spring 42. This further movement of plunger 40 also causes further outward pivotal movement of release lever 54 to push latch surface 58l away from surface 16f as depicted in FIG. 5, allowing tension coil spring 63 to pull the release rod subassembly rearwardly. This enables the release rod subassembly to ultimately move back inwardly when recoupling on a kingpin.

Figure 7:
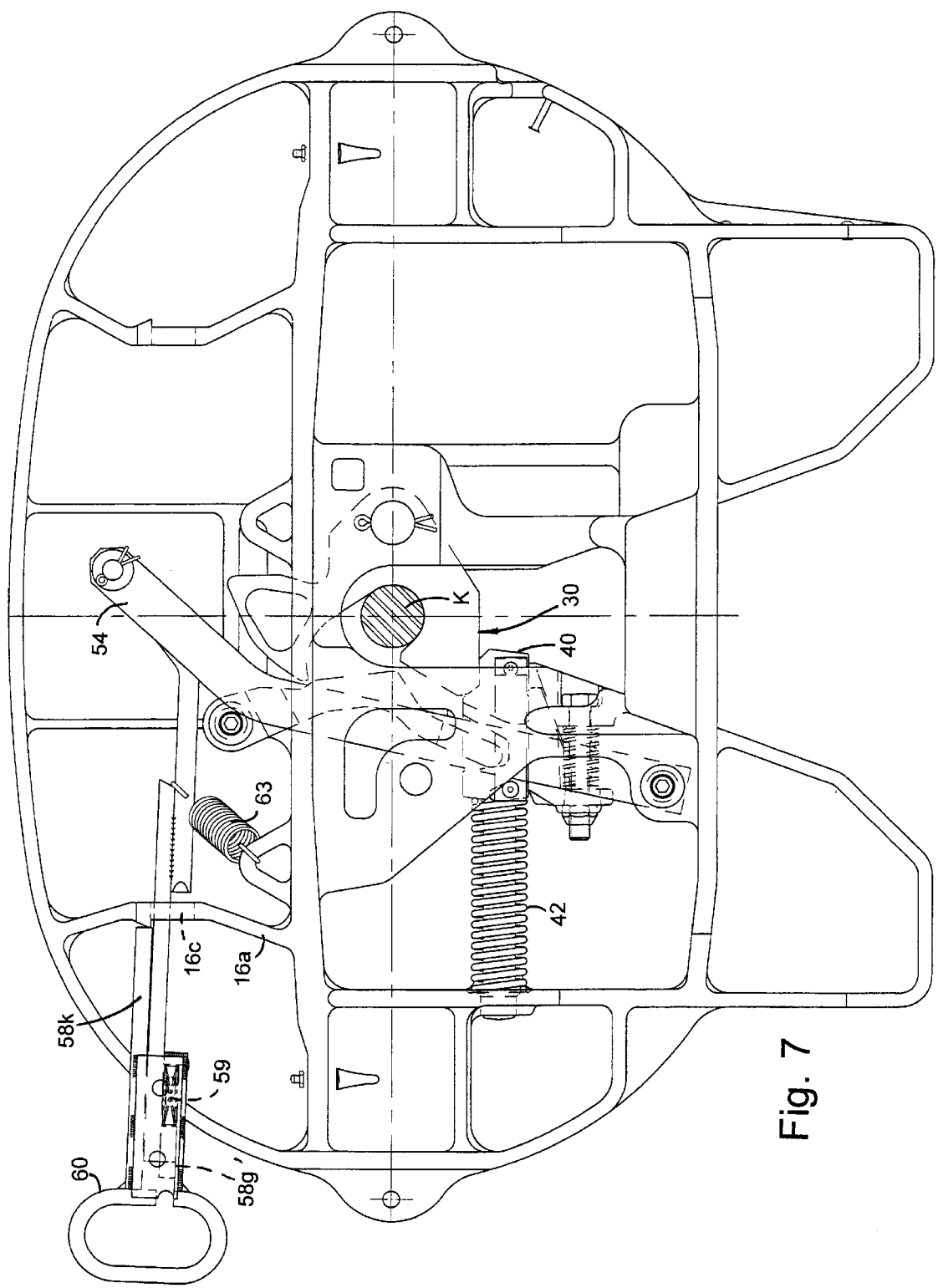
FIG. 7 is a bottom view of the hitch showing the hitch recoupling with a kingpin.

As the kingpin K fully departs the hitch, as in FIG. 6, jaw 30 is fully open so as to receive a kingpin for recoupling. Upon re-entry of a kingpin, it engages camming branch 30a of jaw 30, rotating the jaw to a closed position about the kingpin. This rotation moves camming branch 30a away from cam arm 70 thereby allowing spring 42 to bias plunger 40 back to the extended position. As it so moves, it carries cam arm 70 and release lever 54 with it. This movement of release lever 54 carries release rod subassembly 58 with it, causing segment 58b to move through and clear of window 16c until segment 58k abuts surface 16f to again extend the release rod subassembly 58 as in FIG. 7. In this condition, the hitch is not quite fully locked as shown by the fact that recessed indicator 58g' is not visible. By shifting handle 60 rearwardly relative to the latch, segment 58k is allowed to again pass through window 16c, bringing handle 60 close to slide plate 12 and causing indicator 58g' to again appear, showing that the hitch is fully locked, including the secondary lock, stop face 58c being aligned again with flange 16a rather than window 16c.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A fifth wheel hitch operable between a fully locked condition and a fully released condition, comprising:

a top hitch plate defining a tapered mouth and throat for receiving a kingpin;

a pivotal lock jaw at said throat;

a locking plunger shiftable between an extended locking position engaging said jaw and a retracted position for releasing said jaw, and being biased toward said extended locking position to provide a primary lock;

a release lever pivotally mounted to said hitch plate and engaging said plunger to move said plunger therewith when actuated, for releasing said primary lock;

a hitch release rod subassembly having an outer pull handle and an inner pivotal connection to said release lever for actuating said release lever;

said hitch having a fixed member defining an abutment surface;

said release rod subassembly having a secondary stop aligned with said abutment surface in the fully locked condition to serve as a secondary lock, and shiftable out of alignment with said abutment surface to release said secondary lock;

said release rod subassembly having a limited play connection between its ends, enabling said subassembly to be lengthened a limited amount from its normal length condition to a lengthened condition, and biased toward said normal length condition; and said release rod subassembly having an indicator which provides a change in appearance between said normal length condition and said lengthened condition;

said indicator comprising a portion of said release rod assembly which is visible in one of said conditions and not visible in the other of said conditions; and said portion being visible in said normal length condition to confirm hitch full release or hitch full lock, and not visible in said lengthened condition to alert of a condition other than said hitch full release or hitch full lock.

2. A fifth wheel hitch operable between a fully locked condition and a fully released condition, comprising:

a top hitch plate defining a tapered mouth and throat for receiving a kingpin;

a pivotal lock jaw at said throat;

a locking plunger shiftable between an extended locking position engaging said jaw and a retracted position for releasing said jaw, and being biased toward said extended locking position to provide a primary lock;

a release lever pivotally mounted to said hitch plate and engaging said plunger to move said plunger therewith when actuated, for releasing said primary lock;

a hitch release rod subassembly having an outer pull handle and an inner pivotal connection to said release lever for actuating said release lever;

said hitch having a fixed member defining an abutment surface;

said release rod subassembly having a secondary stop aligned with said abutment surface in the fully locked condition to serve as a secondary lock, and shiftable out of alignment with said abutment surface to release said secondary lock;

said release rod subassembly having a limited play connection between its ends, enabling said subassembly to be lengthened a limited amount from its normal length condition to a lengthened condition, and biased toward said normal length condition; and said release rod subassembly having an indicator which provides a change in appearance between said normal length condition and said lengthened condition;

said second and third segments extending through said window when said hitch is fully locked, and said first and second segments extending through said window when said hitch is fully released.

3. The fifth wheel hitch in claim 2 wherein said second and third segments extend through said window when said hitch is fully locked, and said first and second segments extend through said window when said hitch is fully released.

* * * * *